(12) United States Patent
Raghavan et al.

(10) Patent No.: US 10,940,748 B2
(45) Date of Patent: Mar. 9, 2021

(54) HYBRID TRANSMISSION WITH GEAR-BASED STARTER AND METHOD OF STARTING

(71) Applicant: GM GLOBAL TECHNOLOGY OPERATIONS LLC, Detroit, MI (US)

(72) Inventors: Madhusudan Raghavan, West Bloomfield, MI (US); Neeraj S. Shidore, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 47 days.

(21) Appl. No.: 16/443,136

(22) Filed: Jun. 17, 2019

(65) Prior Publication Data
US 2020/0391584 A1  Dec. 17, 2020

(51) Int. Cl.
| | | |
|---|---|---|
| *B60K 6/26* | (2007.10) | |
| *B60W 20/40* | (2016.01) | |
| *F16H 35/18* | (2006.01) | |
| *B60W 30/18* | (2012.01) | |

(52) U.S. Cl.
CPC .............. *B60K 6/26* (2013.01); *B60W 20/40* (2013.01); *B60W 30/18018* (2013.01); *F16H 35/18* (2013.01); *F16H 2700/04* (2013.01)

(58) Field of Classification Search
CPC ... B60K 6/26; B60W 20/40; B60W 30/18018; F16H 26/18; F16H 2700/04
USPC ........................................................... 475/5
See application file for complete search history.

(56) References Cited

U.S. PATENT DOCUMENTS

| | | | | |
|---|---|---|---|---|
| 5,846,155 A | * | 12/1998 | Taniguchi | ................ B60K 6/48 477/2 |
| 6,655,485 B1 | * | 12/2003 | Ito | ......................... B60K 6/387 180/65.6 |
| 8,123,656 B2 | | 2/2012 | Schoenek et al. | |
| 8,251,166 B2 | | 8/2012 | Holmes et al. | |
| 10,328,929 B2 | * | 6/2019 | Yagasaki | ............... B60W 20/40 |
| 2008/0125264 A1 | * | 5/2008 | Conlon | .................. B60K 6/365 475/5 |
| 2013/0006489 A1 | * | 1/2013 | Kim | ................ B60W 30/18018 701/68 |

FOREIGN PATENT DOCUMENTS

CN  102009588 B  4/2011

* cited by examiner

*Primary Examiner* — Leslie A Nicholson, III
(74) *Attorney, Agent, or Firm* — Cantor Colburn LLP (57) ABSTRACT

A hybrid transmission for use with a vehicle having an engine has an electric-only mode where the engine is off and a hybrid mode where the engine is on. The hybrid transmission includes an engine connection member configured for connection with the engine, a motor/generator unit configured to selectively operate as a motor, a transmission gearing arrangement, and a transmission input member connected with the transmission gearing arrangement. A torque transfer device is controllable to transfer torque from the motor to the transmission input member upstream in power flow from the transmission gearing arrangement, and a starter gear set includes a planetary gear set positioned in power flow between the engine connection member and the motor. The starter gear set is selectively engageable with the transmission input member and the engine connection member.

17 Claims, 4 Drawing Sheets

HYBRID TRANSMISSION WITH GEAR-BASED STARTER AND METHOD OF STARTING

INTRODUCTION

The subject disclosure relates to a hybrid transmission having a gear-based starter used with a motor operable for powering the transmission and being connectable to an engine.

One type of hybrid transmission is a transmission that may be powered by an engine as well as an electric motor/generator connected with an energy storage device. A key goal in designing a hybrid powertrain is to enable high operating efficiency over various operating modes to meet a wide variety of vehicle operating conditions. Often, an electric-only operating mode (i.e., wherein the vehicle is powered only by the motor) and an engine-only operating mode are provided. A hybrid operating mode, in which both the engine and the motor add power, may also be provided. Efficiencies in conducting the various operating modes to best meet vehicle power demands while maintaining smooth transitions between modes are desired.

Accordingly, it is desirable to provide a hybrid transmission having an improved starter for use with a motor and connectable to the engine for powering the transmission and enabling smooth transitions between operating modes.

SUMMARY

In one exemplary embodiment, a hybrid transmission is disclosed for use with a vehicle having an engine. The vehicle has an electric-only mode where the engine is off and a hybrid mode where the engine is on. The transmission includes an engine connection member configured for connection with the engine, a motor/generator unit configured to selectively operate as a motor, a transmission gearing arrangement, and a transmission input member connected with the transmission gearing arrangement, a torque transfer device controllable to transfer torque from the motor to the transmission input member upstream in power flow from the transmission gearing arrangement, and a starter gear set including a planetary gear set positioned in power flow between the engine connection member and the motor. The starter gear set is selectively engageable with the transmission input member and the engine connection member.

In another exemplary embodiment of the hybrid transmission, the starter gear set includes a disconnect clutch that is selectively engageable with the planetary gear set to lock the engine connection member and transmission input member to rotate together when the engine is on when the vehicle is operating in the hybrid mode.

In yet another exemplary embodiment of the hybrid transmission, the starter gear set includes a brake selectively engageable with the planetary gear set to operatively connect the planetary gear set to the transmission input member such that when the brake is engaged, the planetary gear set starts rotation of the engine connection member when the vehicle is in the electric-only mode and prior to starting the engine. When the engine is started, the engine connection member is already rotating and less torque is required to start the engine when transitioning from electric-only mode to hybrid mode.

In a further embodiment of the hybrid transmission, the engine connection member is rotating at about idle speed or less when the engine is started to transition from all-electric mode to hybrid mode for a smooth transition.

In still another embodiment of the hybrid transmission, the brake is configured to be released from the engine connection member when the engine connection member is rotating at about 300 rpm or an engine speed that is sufficient to sustain combustion.

In a further exemplary embodiment of the hybrid transmission, the planetary gear set includes a ring gear in releasable connection with the brake and in operative connection with the transmission input member. The planetary gear set also includes a carrier in rigid connection with the engine connection member and in operative connection with the ring gear, and the brake is selectively engageable with the ring gear to stop rotation of the ring gear and transfer torque upstream from the transmission input member to the sun gear and engine connection member when the engine is off and the vehicle is running in electric-only mode with the motor providing torque to the transmission input member. Upon request of a controller receiving input to transition from electric-only mode to hybrid mode, the brake engages and causes the carrier to initially spin the engine connection member prior to starting the engine whereby engine torque is reduced when the engine is started for hybrid mode.

In yet another exemplary embodiment of the hybrid transmission, the starter gear set includes a disconnect clutch being selectively engageable to operatively connect the engine connection member with the motor to permit the motor to start the engine.

In another embodiment of the hybrid transmission, the starter gear set includes a one-way clutch arranged in parallel with the disconnect clutch. The one-way clutch is continuously connected for rotation with the engine connection member when the engine connection member is spinning faster than the motor and the one-way clutch is configured to overrun and not transfer torque when the motor is spinning faster than the engine connection member.

In a further embodiment of the hybrid transmission, the planetary gear set includes a carrier rigidly connected for rotation with the engine connection member. The planetary gear set also includes a sun gear continuously connected for rotation with the motor at a common speed with the transmission input shaft. The starter gear set includes a disconnect clutch that is selectively engageable with the planetary gear set to lock the engine connection member and transmission input member to rotate together when the engine is on and the vehicle is operating in the hybrid mode, and to release the planetary gear set and disconnect the engine connection member and transmission input member from operative connection such that they rotate independently when the vehicle is in electric-only mode.

According to another exemplary embodiment of the hybrid transmission, the disconnect clutch connects the motor to the planetary gear set, thereby operatively connecting the motor to the engine connection member.

In yet another exemplary embodiment of the hybrid transmission, the torque transfer device is a fluid coupling.

In still yet another exemplary embodiment of the hybrid transmission, the torque transfer device is a clutch directly connecting the motor with the transmission input member, and the hybrid transmission does not include a fluid coupling.

In a further exemplary embodiment of the hybrid transmission, the hybrid transmission is characterized by an absence of any additional motor operatively connected with the transmission gearing arrangement.

In still another exemplary embodiment of the hybrid transmission, the motor is not operatively connected for torque transfer to the transmission gearing arrangement other than by the torque transfer device.

In yet another exemplary embodiment of the hybrid transmission, the motor/generator is controllable to operate as a generator.

In accordance with another exemplary embodiment, a method of starting an engine connected with a hybrid transmission operating in all-electric mode to transition to hybrid mode is disclosed. The method includes powering the transmission through a transmission input member connected to a torque transfer device via a motor powered by a battery when the vehicle is operating in all-electric mode, engaging a brake with a planetary gear set operatively connected between an engine connection member and the transmission input member prior to starting the engine whereby the transmission input member transfers torque to the engine connection member and starts spinning the engine connection member prior to starting the engine, and starting the engine with fuel when the engine speed is at about 300 rpm or an engine speed that is sufficient to sustain combustion.

In another exemplary embodiment, the method includes the step of releasing the brake when the engine is started with fuel and simultaneously engaging a disconnect clutch to rotatably connect to a carrier of the planetary gear set with the transmission input member such that when the engine is started, the disconnect clutch operatively locks together the engine connection member with the planetary gear set and the transmission input member whereby the carrier, engine connection member and transmission input member all rotate together with the motor when the vehicle is operating in hybrid mode.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
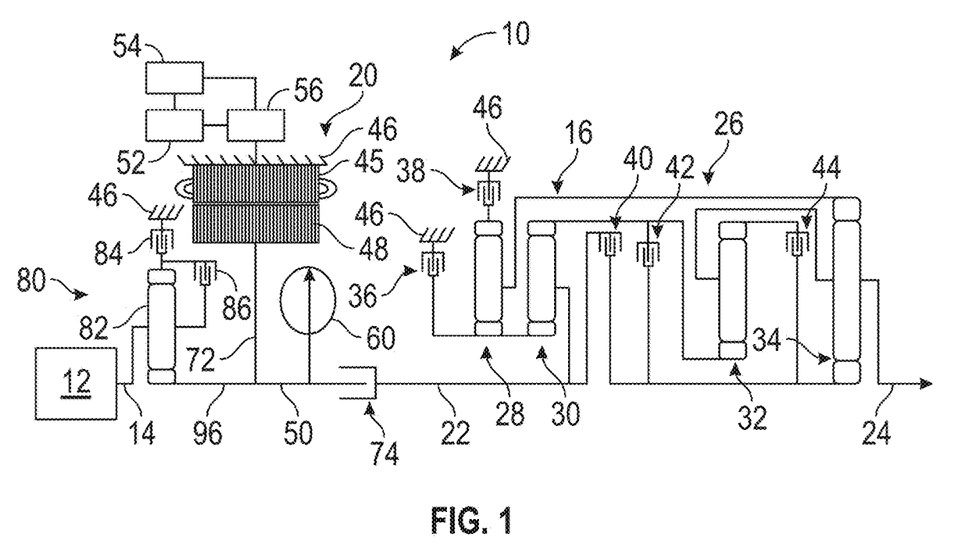
FIG. 1 is a schematic illustration of a first embodiment of a hybrid powertrain including a first embodiment of a hybrid transmission.

Referring to the drawings, wherein like reference numbers refer to like components throughout the views, FIG. 1 shows a hybrid powertrain 10 that includes an engine 12 connected to an engine connection member 14 of a hybrid transmission 16 so that the engine connection member 14 rotates commonly with an engine output member, such as an engine crankshaft (not shown). The hybrid transmission 16 includes an electric motor/generator 20 operatively connectable with the engine 12 and with a transmission input member 22, as explained herein. The engine 12 is also operatively connectable to the transmission input member 22, as further explained herein. It will be appreciated that a one-way clutch (not shown) may be added between the engine connection member 14 and ground to ensure that the engine connection member 14 cannot spin backwards, as is known in the art.

Various operating modes are available to provide torque from the transmission input member 22 to a transmission output member 24 through a transmission gearing arrangement 26. The transmission gearing arrangement 26 includes a variety of transmission gears, here in the form of interconnected planetary gear sets 28, 30, 32, 34, and selectively engageable ratio clutches 36, 38, 40, 42, 44 (including both stationary-type and rotating-type clutches) that are engaged in different combinations via pressurized transmission fluid to provide a variety of speed ratios between the transmission input member 22 and the transmission output member 24. Although a specific transmission gearing arrangement 26 is shown for purposes of illustration in FIG. 1, a wide variety of transmission gearing arrangements may be connected between the transmission input member 22 and the transmission output member 24 within the scope of the claimed invention. For example, the transmission gearing arrangement may instead be a countershaft arrangement having intermeshing gears, or a combination of planetary gear sets with intermeshing gears, with either fewer or more selectively engageable clutches.

The entire hybrid transmission 16 between the engine connection member 14 and the transmission output member 24 is contained in one or more interconnected housings or casings (shown only in fragmentary manner, such as stationary member 46). For clarity in the drawings, components of the hybrid transmission 16 are shown only above the engine connection member 14, the transmission input member 22 and the transmission output member 24 in FIG. 1, but many of the components are substantially symmetrical about these members, as will be well understood by those skilled in the art.

Referring to FIG. 1, the motor/generator 20 includes a stator 45 grounded to a stationary member 46, such as a transmission housing. A rotor 48 of the motor/generator 20 is rotatable concentrically about and with an intermediate shaft 50 via a rotor hub 72. The stator 45 may receive electrical power from or provide electrical power to an energy storage device such as a battery 52. An electronic controller 54 is in signal communication with the battery 52 and with a power inverter 56 that is also in electrical communication with the stator 45. The controller 54 responds to a variety of input signals including vehicle speed, operator demand, the level at which the battery 52 is charged and the power being provided by the engine 12 to regulate the flow of power between the motor/generator 20 and the battery 52 via the inverter 56. The inverter 56 converts between direct current provided or utilized by the battery 52 and alternating current provided or utilized by the stator 45. The level at which the battery 52 is charged is monitored by any number of known indicators, such as by a voltmeter to monitor the battery voltage and/or monitoring the battery discharge current.

The main transmission pump 60 is used for pressurizing transmission fluid for actuating the ratio clutches 36, 38, 40, 42 and 44 and for cooling and lubrication throughout the transmission 16. The pump 60 is connected for common rotation with the rotor 48 via the intermediate shaft 50. Thus, the motor/generator 20 drives the transmission pump 60 regardless of whether the engine 12 is started or stopped.

As shown in FIG. 1, the starter gear set 80 is connected between the engine connection member 14 and the motor/generator 20. The starter gear set 80 is comprised of a planetary gear set 82, a brake 84, and a disconnect clutch 86. The motor/generator 20 is connected to the remainder of the hybrid transmission 16 by the intermediate shaft 50. Advantageously, it will be appreciated that the starter gear set 80 significantly reduces the reflected engine cranking torque on a driveline (not shown) to enable smooth transitions between the electric-only operating mode and the hybrid operating mode of the vehicle, as described further herein. The driveline refers to components that connect the powertrain 10 to wheel axles of the vehicle. It will be appreciated that in the electric-only mode, the vehicle is powered only by the motor/generator 20 operating as a motor. In the hybrid mode, both the engine 12 and the motor/generator 20 provide power and torque to the hybrid transmission 16. It will further be appreciated that the powertrain 10 may operate in an engine-only mode, for example when the battery 52 has no charge, in which mode only the engine 12 provides power.

Figure 2:
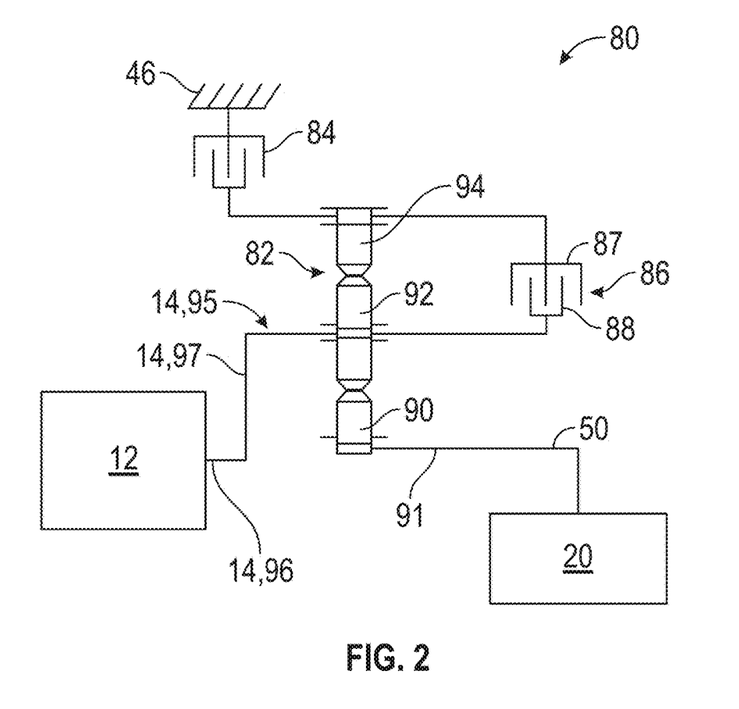
FIG. 2 is a schematic illustration of a portion of a hybrid powertrain including a schematic illustration of a starter gear set.

Referring to FIG. 2, the planetary gear set 82 includes a central sun gear 90, a concentric outer ring gear 94, and three planet gears 92 positioned concentrically between and engaging the sun gear 90 and the ring gear 94. While the exemplary planetary gear set would have three planet gears 92, it will be appreciated that at least two or more planet gears may be used. The planetary gear set 82 further includes a carrier 95 having radially extending arms 97 fixedly connected to an axis of each of the planet gears 92. The carrier 95 also includes a carrier shaft 96 fixedly attached to or integrally formed with the engine connection member 14 such that the carrier shaft 96 of the carrier 95 extends in an upstream direction from the carrier 95, as described herein, and rotates in unison with the engine connection member 14. Referring to FIGS. 1 and 2, it will be appreciated that the sun gear 90, including a sun gear shaft 91, rotate in unison with the intermediate shaft 50 and transmission input member 22. The sun gear 90, sun gear shaft 91, and intermediate shaft 50 may be one piece or multiple axially extending pieces fixedly attached to one another such that they rotate in unison. It will further be appreciated that the intermediate shaft 50 rotates with the transmission input member 22 and is operatively connected through clutch 74 or other suitable clutching arrangements, as described herein.

The engine connection member 14 is integrally formed with or fixedly attached to and extending upstream, as described herein, from a center of the carrier 95. It will be appreciated that the carrier 95, the carrier shaft 96, the carrier radial arms 97, and engine connection member 14 are rigidly connected and rotate in unison when rotating. It will be further appreciated that the engine connection member 14 may extend from the crankshaft of the engine 12 to the center of the carrier 95 as one piece or can be made of multiple axially extending pieces fixedly attached at one end to the carrier 95 and at another end to the engine 12.

It will further be appreciated that a damper element (not shown) may be placed between the engine 12 and the starter gear set 80. By way of examples, the damper may be placed at the connection of the engine 12 to the engine connection member 14, or at the connection of the engine member 12 to the starter gear set 80, or otherwise along the engine connection member 14 at a junction of the carrier 95.

The brake 84 is selectively engageable with the ring gear 94. It will be appreciated that the brake 84 is grounded, such as to the stationary member 46 of the transmission housing. The brake 84 may be pressurized and placed in an ON position wherein the brake 84 engages and stops the ring gear 94 from rotation. The brake 84 may be disengaged or in an OFF position wherein the ring gear 94 is free to rotate. The brake 84 is engaged/ON or disengaged/OFF based on input from the controller 54, as described herein.

The disconnect clutch 86 has a first side 87 connected to the ring gear 94 and a second side 88 connected to the carrier 95. When the disconnect clutch 86 is disengaged or in an OFF position, then the first side 87 of the disconnect clutch 86 does not touch, and is disengaged from, the second side 88 of the disconnect clutch 86 thus leaving the ring gear 94 and carrier 95 free to separately rotate. When the disconnect clutch 86 is pressurized or in an ON position, then the first side 87 of the disconnect clutch 86 is rigidly engaged with the second side 88 of the disconnect clutch 86, such that the ring gear 94 and carrier 95 are forced to rotate in unison. Thus, the disconnect clutch 86 is selectively engageable to connect the ring gear 94 and carrier 95 for common rotation when directed by the controller 54, as described further herein. It will be appreciated that when the disconnect clutch 86 is engaged, then the engine connection member 14 and the intermediate shaft 50 are forced to rotate in unison.

With reference to FIG. 1, a torque transfer device 74, which in this embodiment is a selectively engageable clutch that may be a wet clutch or a dry clutch and is referred to as a vehicle launch clutch, is engageable to transfer torque from the intermediate shaft 50 to the transmission input member 22. The transmission input member 22 and the transmission gearing arrangement 26 do not receive torque from either the motor/generator 20 or the engine 12 without engagement of the torque transfer device 74. The torque transfer device 74 may be a wet friction clutch engageable at a controlled slip to enable smooth transitions in power flow. Alternately, the torque transfer device torque transfer device 74 may be a dry clutch, similar to a manual transmission shifting clutch. As used herein components such as shafts are "upstream" in power flow in relation to other components in the hybrid transmission 16 when they receive torque applied to the engine connection member 14 by the engine 12 prior to the other components. Similarly, components are "downstream" in power flow relation to other components in the hybrid transmission 16 when they receive torque applied to the engine connection member 14 by the engine 12 after the other components. While these exemplary and schematic drawings show the motor/generator 20 and the intermediate shaft 50 as being on the same axis with a common centerline and spinning in unison, it will be appreciated that the motor/generator 20 and the intermediate shaft 50 may each be on a different axis with offset centerlines, such as there may be a chain, belt, or gear connection between the axis of the motor/generator 20 and the axis of the intermediate shaft 50 to define a variable speed ratio therebetween. By way of example, the motor/generator may spin at 2.5 times the speed of the intermediate shaft 50. Thus, any reference herein to the motor/generator 20 and the intermediate shaft 50 spinning in unison or at a common speed also includes rotating together, but with this variable speed ratio.

It will be appreciated that when the vehicle is in the electric-only or hybrid mode that the motor/generator 20 is continually active to transfer torque to the intermediate shaft 50 and transmission input member 22. If the battery 52 has insufficient charge, then the powertrain 10 operates in the engine-only mode and the engine connection member 14 rotates the carrier 95 and thus the intermediate shaft 50 without assistance of the motor/generator 20. It will be appreciated that the powertrain 10 advantageously only includes one motor/generator 20 and does not require a second motor/generator for starting.

When the powertrain 10 is operating in the electric-only mode, then the engine 12 is off and the engine connection member 14 is not rotating and does not provide torque to the upstream components of the hybrid transmission 16. In such condition, the starter gear set 80 is fully disengaged meaning that both the brake 84 and disconnect clutch 86 are in the OFF or disengaged positions whereby the carrier 95 is stationary due to the weight or drag of the engine 12 keeping the engine connecting member 14 also stationary. The ring gear 94 will be rotating in a direction opposite to that of the sun gear 90 that will be rotating in unison with the intermediate shaft 50. Stationary as used herein means not rotating. In the electric-only mode, torque is provided to the intermediate shaft 50 entirely by the motor/generator 20 operating as a motor.

While operating in the electric-only mode, it will be appreciated that the brake 84 and disconnect clutch 86 are not engaged and are both in OFF positions, but that intermediate shaft 50 is rotating by the torque transmitted from the motor/generator 20. Once the accelerator pedal (not shown) is pressed by a vehicle operator and passes a certain threshold of desired power that cannot be met by the motor/generator 20 alone, then the brake 84 receives instructions from the controller 54 to engage the ring gear 94. Once the ring gear 94 is engaged by the brake 84, then the ring gear 94 causes the engine connection member 14 to start to spin prior to starting the engine 12 with fuel, as described further herein.

The hybrid transmission 16 may be controlled according to a method allowing the motor/generator 20 to restart the engine 12 after a stop such as at a stoplight. Specifically, when the vehicle inputs (such as from an accelerator pedal) to the controller 54 indicate a need to start the engine 12, then oil pressure is sent to pressurize the brake 84. The brake 84 is in an ON position where it engages and stops the ring gear 94 from spinning. When the ring gear 94 is forced to stop spinning, then the carrier 95 of the planetary gear set 82 is forced to spin with the intermediate shaft 50 being spun by the motor/generator 20. The carrier 95 is connected to the engine connection member 14 and causes the engine 12 to start to spin while the engine 12 is still off (no fuel delivered) at this point in the process. Advantageously, the starter gear set 80 behaves like a small engine and it forces the motor/generator 20 to start the engine connection member 14 and engine 12 spinning up to a certain initial speed without yet providing any fuel to the engine 12 or actually starting the engine 12. Once a certain initial engine speed is reached for stable combustion, then fuel is provided to engine 12 to start the engine 12. The initial speed of the engine 12 and engine connection member 14 prior to starting the engine 12 is approximately when the engine 12 is at a speed higher than about 300 rpm. Once this initial engine speed is reached, the engine 12 is fueled and fired and the engine speed continues to increase. Once the engine 12 has fired and is turning under its own power, then the controller 54 signals the brake 84 to an OFF position meaning the brake 84 disengages and releases the ring gear 94. As the engine speed continues to rise, it will equal the speed of the intermediate shaft 50. At this time, the disconnect clutch 86 goes to an ON position or is engaged, thus connecting the ring gear 94 and the carrier 95 which are locked together and must now rotate together at the same speed with the engine connection member 14 and the intermediate shaft 50. It will be appreciated that the starter gear set 80 stays in this condition (with the brake 84 OFF or disengaged and the disconnect clutch 86 ON or engaged) at all times while the vehicle is operating in the hybrid mode or engine only mode.

It will further be appreciated that while the disconnect clutch 86 is shown as rigidly connecting the ring gear 94 and the carrier 95 when engaged, due to the customary relationship of the gears in the planetary gear set 82, it will be appreciated that the disconnect clutch 86 could alternatively be placed between the ring gear 94 and the sun gear 90 or alternatively between the carrier 95 and the sun gear 90 to achieve the same locking function wherein when the disconnect clutch 86 is ON or engaged, then the engine 12 and its engine connection member 14 have to spin at the same speed as the intermediate shaft 50.

When the controller 54 receives an input from the vehicle to operate at a coasting speed and switch from hybrid mode to electric-only mode, then no fuel is provided to the engine 12 and the engine 12 is off and the disconnect clutch 86 is OFF or disengaged to release the ring gear 94 and carrier 95 whereby the motor/generator 20 becomes the sole torque provider to the intermediate shaft 50 in the electric-only mode, as described herein.

When the controller 54 receives input from the vehicle to slow down, the engine 12 is not provided fuel and is turned off such that the engine 12, and thus the engine connection member 14, create a drag or torque which is in the opposite direction to the direction of rotation. At this point when running in the hybrid mode, it should be appreciated that the disconnect clutch 86 has the engine connection member 14 and intermediate shaft 50 locked together to rotate in unison with the motor/generator 20. It will be appreciated that while the disconnect clutch 86 is engaged with the engine 12 off, the motor/generator 20 may behave as a generator and regenerative energy may be stored in the battery 52 of the motor/generator 20. Once a desired slower rotation speed is reached, then the disconnect clutch 86 may be released and the vehicle may coast in electric-only mode.

It will be appreciated that the motor/generator 20 may be operated as a generator to slow the intermediate shaft 50 as desired, such as during vehicle braking.

Figure 3:
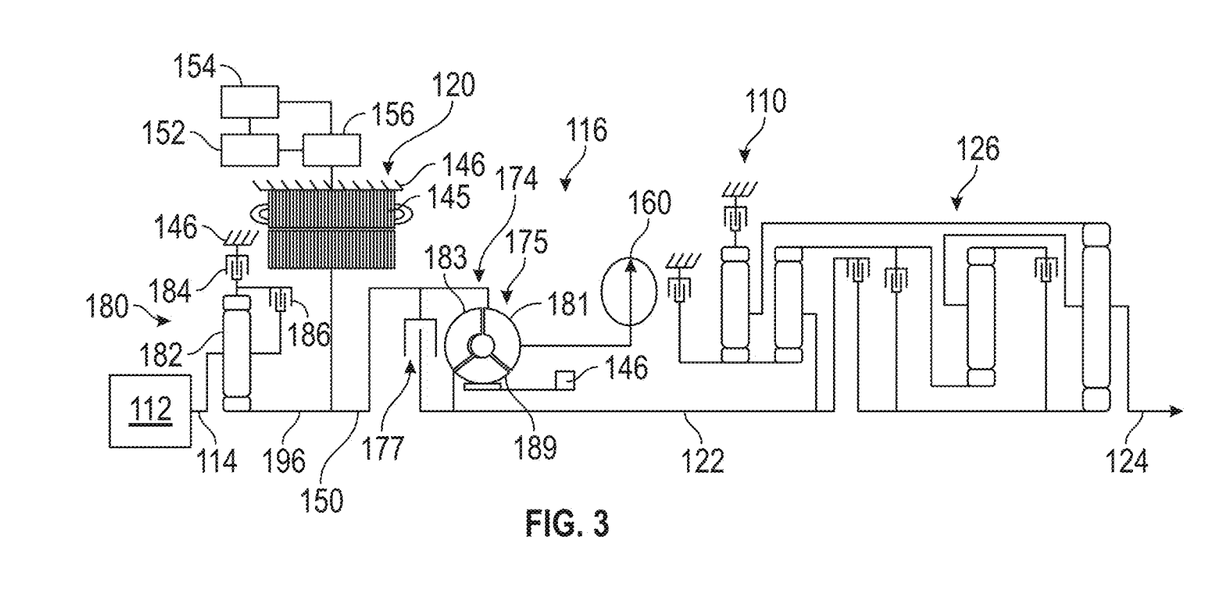
FIG. 3 is a schematic illustration of a second embodiment of a hybrid powertrain including a second embodiment of a hybrid transmission.

The method may also be applied to the additional embodiments described herein, slightly modified for those embodiments having a fluid coupling in the form of a torque converter, with a torque converter clutch, as described with respect to the embodiment of FIG. 3, because the fluid coupling of a torque converter continuously transfers torque and need not be engaged via a controller; although a torque converter clutch is engageable via the controller to bypass the fluid coupling.

Referring to FIG. 3, another exemplary embodiment of a hybrid powertrain 110 having an alternative torque transfer device includes an engine 112 connected to an engine connection member 114 of a hybrid transmission 116 so that the engine connection member 114 rotates commonly with an engine output member, such as an engine crankshaft. The hybrid transmission 116 includes an electric motor/generator 120 operatively connectable with the engine 112 and with a transmission input member 122. An energy storage device such as a battery 152 receives electrical power from or provides electrical power to the stator 145 of the motor/generator 120 via a controller 154 and a power inverter 156, as explained with respect to similar components of FIG. 1. The engine 112 is operatively connectable to the transmission input member 122 as further explained below. Various operating modes are available to provide torque from the transmission input member 122 to a transmission output member 124 through a transmission gearing arrangement 126 shown for purposes of illustration similar to transmission gearing arrangement 26 of FIG. 1, but representing any variety of mechanical transmission gear and clutch arrangements.

The transmission 116 includes a starter gear set 180 including a planetary gear set 182 having a carrier shaft 196, a brake 184 grounded to a stationary member 146 of the transmission housing, and a disconnect clutch 186. The starter gear set 180 is arranged and operable in a like manner as described with respect to the like components (starter gear set 80, planetary gear set 82, carrier shaft 96, brake 84, and disconnect clutch 86) of FIG. 1. The transmission 116 differs from transmission 16 of FIG. 1 in that the torque transfer device 174 is a torque converter including a fluid coupling 175 and a selectively engageable torque converter lock-up clutch 177, rather than the selectively engageable wet or dry friction clutch 74 of FIG. 1. The fluid coupling 175 of the torque converter 174 includes a pump portion 181 connected for rotation of a main transmission pump 160 and with an intermediate shaft 150 that is also connected with the rotor 148. Thus, the pump 160 can be driven by the motor/generator 120 when the engine 112 is stopped. A turbine portion 183 of the fluid coupling 175 is connected for rotation with the transmission input member 122 and is driven by the pump portion 181. A stator portion 189 is grounded to a stationary member 146, such as a torque converter housing or the transmission casing.

The hybrid powertrain 110 is operable to power the transmission 116 from a stop and to start the engine 112 according to the method described with respect to FIG. 1, with the starter gear set 180 with planetary gear set 182, brake 184, and disconnect clutch 186 operating in like manner to the similar components of FIG. 1, with the brake 184 being engaged to start to spin the engine connection member 114 and then disengaged after the engine 112 is started and the disconnect clutch 186 is engaged.

Figure 4:
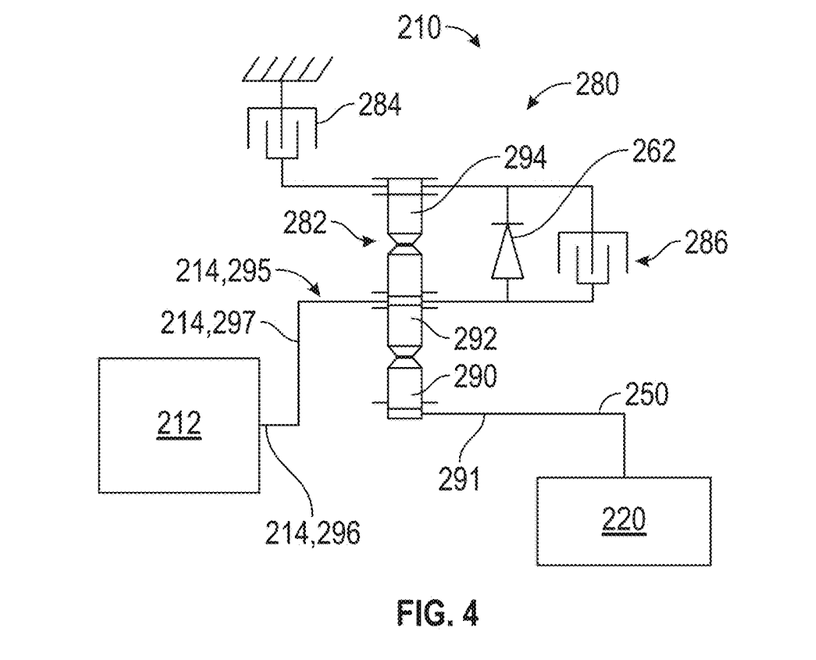
FIG. 4 is a schematic illustration of a portion of a hybrid powertrain including a schematic illustration of a second embodiment of a starter gear set.
Figure 5:
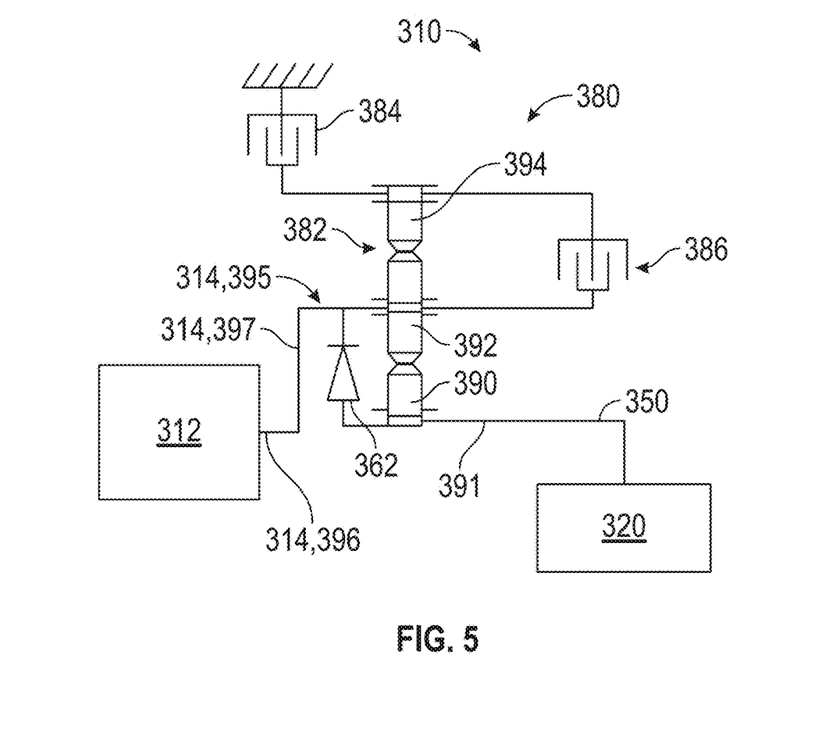
FIG. 5 is a schematic illustration of a portion of a hybrid powertrain including a schematic of a third embodiment of a starter gear set.

With reference to FIGS. 4 and 5, it will further be appreciated that alternative embodiments of the starter gear set 280, 380 include a one-way clutch 262, 362 added in parallel or functionally in parallel with the disconnect clutch 286, 386. The one-way clutch 262, 362 and disconnect clutch 286, 386 are referred to as "in parallel" with each other as they are each engageable to transfer torque from the engine connection member 214, 314 to the intermediate shaft 250, 350. Accordingly, the one-way clutch 262, 362 and the disconnect clutch 286, 386 are referred to as "in parallel" with one another in the embodiments of FIGS. 4 and 5 as they are each engageable to connect the same two components.

With reference to FIG. 4, a portion of a powertrain 210 includes an engine 212 and a motor/generator 220 that function similar to the engine 12 and motor/generator 20 of powertrain 10 as described with respect to FIGS. 1 and 2. The alternative embodiment of the starter gear set 280 includes a brake 284, the disconnect clutch 286, and a planetary gear set 282 having a carrier 295, a sun gear 290 having a sun gear shaft 291, and a ring gear 294. The planetary gear set 282 also includes planet gears 292, a carrier shaft 296, and carrier radial arms 297. The components of the planetary gear set 280 function similar to similarly named components described with respect to planetary gear set 80 of FIGS. 1 and 2. In this embodiment, the mechanical one-way clutch 262 is connected between the carrier 295 and the ring gear 294. When the ring gear 294 is rotating slower than the carrier 295, then the one-way clutch 262 will remain open and overrun or "free wheel" without transferring torque. However, when the ring gear 294 rotates at the same speed or faster than the carrier 295, then the one-way clutch 262 will lock. Advantageously, the mechanical one-way clutch 262 does not require any signal from any controller to function. Also advantageously, the one-way clutch 262 reacts immediately since it operates mechanically and does not require a controller signal or pressurization to lock as necessary for the bi-directional disconnect clutch 286. This one-way clutch 262 can be added to remove any minor latency, such as a few milliseconds, while the disconnect clutch 286 receives the controller signal and pressurizes to lock. A variety of one-way clutches are readily commercially available to perform as indicated.

Referring now to FIG. 5, a portion of a powertrain 310 includes an engine 312 and a motor/generator 320 that function similar to the engine 12 and motor/generator 20 of powertrain 10 as described with respect to FIGS. 1 and 2. The alternative embodiment of the starter gear set 380 includes a brake 384, the disconnect clutch 386, and a planetary gear set 382 having a carrier 395, a sun gear 390 having a sun gear shaft 391, and a ring gear 394. The planetary gear set 382 also includes planet gears 392, a carrier shaft 396, and carrier radial arms 397. The components of the planetary gear set 380 function similar to similarly named components described with respect to planetary gear set 80 of FIGS. 1 and 2. In this embodiment, the mechanical one-way clutch 362 is connected between the engine connection member 314 and the intermediate shaft 350, or more specifically, between the carrier 395 and the sun gear 390. When the carrier 395 is rotating slower than the sun gear 390, then the one-way clutch 362 will remain open and overrun or "free wheel" without transferring torque. However, when the carrier 395 rotates at the same speed or faster than the sun gear 390, then the one-way clutch 362 will lock. Advantageously, the mechanical one-way clutch 362 does not require any signal from any controller to function and may be added to help to isolate torsional vibrations of the engine 312 from the disconnect clutch 386, the intermediate shaft 350 and the remainder of the hybrid transmission.

Figure 6:
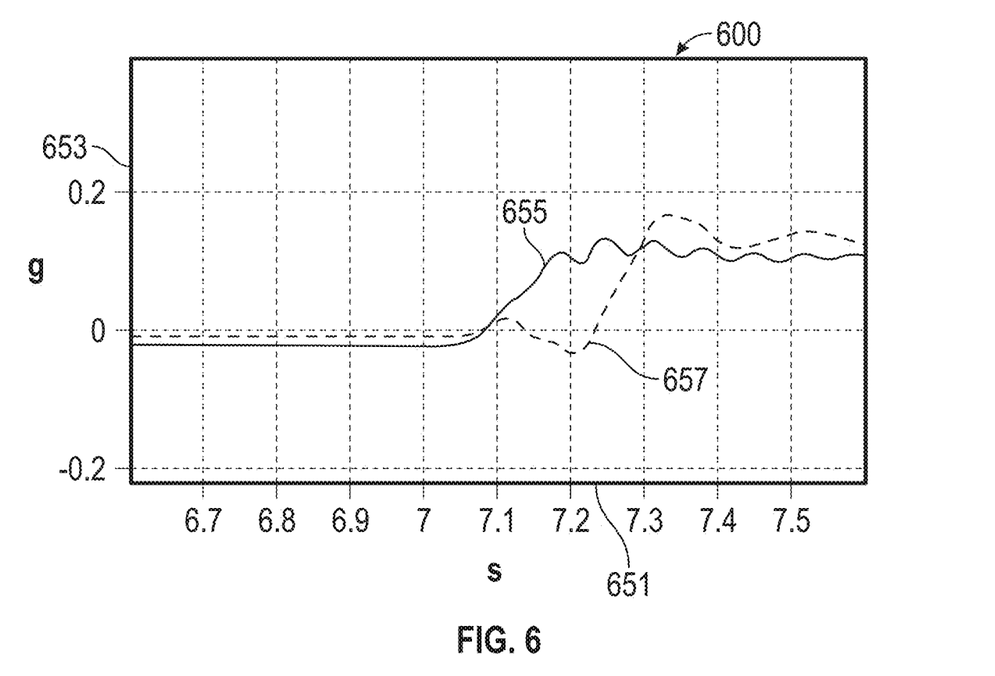
FIG. 6 is a graph showing vehicle acceleration versus time for an exemplary hybrid powertrain including a starter gear set compared to a hybrid powertrain without a starter gear set.

With reference to FIG. 6, an exemplary graph 600 shows a plot of vehicle acceleration in g's on a vertical axis 653 versus time in seconds on a horizontal axis 651. A first line 655 shows the plot of the powertrain 10 using the starter gear set 80 as compared to a second line 657 being a traditional hybrid powertrain without a starter gear set and with a traditional clutch between an engine and an intermediate shaft. For both lines 655, 657, the engine start decision from the controller 54 occurs at a time of about 7 seconds on the graph. It will be appreciated that the acceleration of the first line 655 is much smoother than the second line 657 and avoids the torque drop of the second line 657 shown at around 7.2-7.3 seconds on the graph. For the first line 655 with the starter gear set 80, the engine torque during crank, as reflected on the driveline, is advantageously lowered with the use of the planetary gear set 82. The motor/generator 20 is used to cancel any remaining engine torsional torque, thus providing a smooth transition from electric-only to hybrid mode and with minimal driveline disturbance.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A hybrid transmission for use with a vehicle having an engine, the vehicle having an electric-only mode where the engine is off and a hybrid mode where the engine is on, the hybrid transmission comprising:
   an engine connection member configured for connection with the engine;
   a motor/generator unit configured to selectively operate as a motor;
   a transmission gearing arrangement;
   a transmission input member connected with the transmission gearing arrangement;
   a torque transfer device controllable to transfer torque from the motor to the transmission input member upstream in power flow from the transmission gearing arrangement; and
   a starter gear set, including a planetary gear set, positioned in power flow between the engine connection member and the motor, the starter gear set being selectively engageable with the transmission input member and the engine connection member, wherein the starter gear set includes a disconnect clutch being selectively engageable to operatively connect the engine connection member with the motor to permit the motor to start the engine.

2. The hybrid transmission of claim 1, wherein:
   the disconnect clutch is selectively engageable with the planetary gear set to lock the engine connection member and transmission input member to rotate together when the engine is on when the vehicle is operating in the hybrid mode.

3. The hybrid transmission of claim 1, wherein:
   the starter gear set includes a brake selectively engageable with the planetary gear set to operatively connect the planetary gear set to the transmission input member such that when the brake is engaged, the planetary gear set starts rotation of the engine connection member when the vehicle is in the electric-only mode and prior to starting the engine whereby when the engine is started, the engine connection member is already rotating wherein less torque is required to start the engine when transitioning from electric-only mode to the hybrid mode.

4. The hybrid transmission of claim 3, wherein the engine connection member is rotating at about idle speed or less when the engine is started to transition from the electric-only mode to the hybrid mode for a smooth transition.

5. The hybrid transmission of claim 4, wherein the brake is configured to be released from the engine connection member when the engine connection member is rotating at about 300 rpm or an engine speed that is sufficient to sustain combustion.

6. The hybrid transmission of claim 3, wherein the brake is configured to be released from the engine connection member when the engine connection member is rotating at about 300 rpm or an engine speed that is sufficient to sustain combustion.

7. The hybrid transmission of claim 3, wherein the planetary gear set includes a sun gear, a ring gear in releasable connection with the brake and in operative connection with the transmission input member, and the planetary gear set includes a carrier in rigid connection with the engine connection member and in operative connection with the ring gear; and
   the brake being selectively engageable with the ring gear to stop rotation of the ring gear and transfer torque upstream from the transmission input member to the sun gear and engine connection member when the engine is off and the vehicle is running in the electric-only mode with the motor providing torque to the transmission input member whereby upon request of a controller receiving input to transition from electric-only mode to the hybrid mode, the brake engages and causes the carrier to initially spin the engine connection member prior to starting the engine whereby engine torque is reduced when the engine is started for the hybrid mode.

8. The hybrid transmission of claim 1, wherein the starter gear set includes a one-way clutch arranged in parallel with the disconnect clutch, the one-way clutch continuously connected for rotation with the engine connection member when the engine connection member is spinning faster than the motor and the one-way clutch configured to overrun and not transfer torque when the motor is spinning faster than the engine connection member.

9. The hybrid transmission of claim 1, wherein:
   the planetary gear set includes a carrier rigidly connected for rotation with the engine connection member, and the planetary gear set includes a sun gear continuously connected for rotation with the motor at a common speed with the transmission input shaft; and
   the starter gear set includes a disconnect clutch that is selectively engageable with the planetary gear set to lock the engine connection member and transmission input member to rotate together when the engine is on and the vehicle is operating in the hybrid mode, and to release the planetary gear set and disconnect the engine connection member and transmission input member from operative connection such that they rotate independently when the vehicle is in the electric-only mode.

10. The hybrid transmission of claim 8, wherein the disconnect clutch connects the motor to the planetary gear set, thereby operatively connecting the motor to the engine connection member.

11. The hybrid transmission of claim 1, wherein the torque transfer device is a fluid coupling.

12. The hybrid transmission of claim 1, wherein the torque transfer device is a clutch directly connecting the motor with the transmission input member; and wherein the hybrid transmission does not include a fluid coupling.

13. The hybrid transmission of claim 1, wherein the hybrid transmission is characterized by an absence of any additional motor operatively connected with the transmission gearing arrangement.

14. The hybrid transmission of claim 1, wherein the motor is not operatively connected for torque transfer to the transmission gearing arrangement other than by the torque transfer device.

15. The hybrid transmission of claim 1, wherein the motor/generator unit is controllable to operate as a generator.

16. A hybrid transmission for use with a vehicle having an engine, the vehicle having an electric-only mode where the engine is off and a hybrid mode where the engine is on, the hybrid transmission comprising:
- an engine connection member configured for connection with the engine;
- a motor/generator unit configured to selectively operate as a motor;
- a transmission gearing arrangement;
- a transmission input member connected with the transmission gearing arrangement;
- a torque transfer device controllable to transfer torque from the motor to the transmission input member upstream in power flow from the transmission gearing arrangement;
- a starter gear set, including a planetary gear set, positioned in power flow between the engine connection member and the motor, the starter gear set being selectively engageable with the transmission input member and the engine connection member; and
- the starter gear set including a disconnect clutch that is selectively engageable with the planetary gear set to lock the engine connection member and transmission input member to rotate together when the engine is on when the vehicle is operating in the hybrid mode, wherein the disconnect clutch is selectively engageable to permit the motor to start the engine.

17. A method of starting an engine connected with a hybrid transmission operating in all-electric mode to transition to hybrid mode, the method comprising:
- powering the transmission through a transmission input member connected to a torque transfer device via a motor powered by a battery when the vehicle is operating in the all-electric mode;
- engaging a brake with a planetary gear set operatively connected between an engine connection member and the transmission input member prior to starting the engine whereby the transmission input member transfers torque to the engine connection member and starts spinning the engine connection member prior to starting the engine;
- starting the engine with fuel when the engine speed is at about 300 rpm or an engine speed that is sufficient to sustain combustion; and
- releasing the brake when the engine is started with fuel and simultaneously engaging a disconnect clutch to rotatably connect the planetary gear set with the transmission input member such that when the engine is started, the disconnect clutch operatively locks together the engine connection member with a carrier of the planetary gear set and the transmission input member whereby the carrier, engine connection member and transmission input member all rotate together with the motor when the vehicle is operating in the hybrid mode.

* * * * *